US012476402B2

(12) United States Patent
Jeong et al.

(10) Patent No.: US 12,476,402 B2
(45) Date of Patent: Nov. 18, 2025

(54) CONNECTOR FOR PREVENTING CHARACTERISTIC IMPEDANCE MISMATCH

(71) Applicant: KMW INC., Hwaseong-si (KR)

(72) Inventors: Bae Mook Jeong, Suwon-si (KR); Seong Min Ahn, Namyangju-si (KR); Min Hee Lee, Yongin-si (KR); Kong Moo Heo, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 301 days.

(21) Appl. No.: 18/070,555

(22) Filed: Nov. 29, 2022

(65) Prior Publication Data

US 2023/0087867 A1 Mar. 23, 2023

Related U.S. Application Data

(63) Continuation of application No. PCT/KR2021/006781, filed on Jun. 1, 2021.

(30) Foreign Application Priority Data

Jun. 1, 2020 (KR) ........................ 10-2020-0065810

(51) Int. Cl.
*H01R 12/00* (2006.01)
*H01R 12/71* (2011.01)
(Continued)

(52) U.S. Cl.
CPC ........... *H01R 12/91* (2013.01); *H01R 12/716* (2013.01); *H01R 13/6473* (2013.01)

(58) Field of Classification Search
CPC .................................................... H01R 12/716
See application file for complete search history.

(56) References Cited

U.S. PATENT DOCUMENTS 6,699,054 B1 * 3/2004 Critelli .................. H01R 24/50 439/63
7,416,418 B2 8/2008 Berthet et al.
(Continued)

FOREIGN PATENT DOCUMENTS

CN 101183760 A 5/2008
CN 101286607 A 10/2008
(Continued)

OTHER PUBLICATIONS

Extended European Search Report mailed on May 23, 2024 from the European Patent Office for European Application No. 21818528.8.
(Continued)

*Primary Examiner* — Phuong Chi Thi Nguyen
(74) *Attorney, Agent, or Firm* — Insight Law Group, PLLC; Seung Lee

(57) ABSTRACT

A connector for preventing a characteristic impedance mismatch includes a stationary module fixed, by soldering, to any one (a 'first panel') of two panels disposed in parallel with each other, the stationary module having therein an impedance matching space (a 'matching space'), a moving module disposed to move to the inside or outside of the matching space of the stationary module and provided to be in contact with the other (a 'second panel') of the two panels, and an elastic member disposed in the matching space of the stationary module and configured to elastically support the moving module on the second panel, in which the elastic member, together with an external conductor part of the moving module, performs a function of blocking static electricity, which makes it possible to manufacture a product with a reduced size and prevent a characteristic impedance mismatch.

14 Claims, 7 Drawing Sheets

(51) Int. Cl.
*H01R 12/91* (2011.01)
*H01R 13/6473* (2011.01)

(56) References Cited

U.S. PATENT DOCUMENTS

| | | | | |
|---|---|---|---|---|
| 7,922,529 | B1 * | 4/2011 | Meurer | H01R 13/2421 439/700 |
| 8,888,527 | B2 * | 11/2014 | Chastain | H01R 24/545 439/578 |
| 10,998,660 | B2 * | 5/2021 | Chen | H01R 13/11 |
| 11,539,167 | B2 * | 12/2022 | Volkov | H01R 13/635 |
| 12,184,024 | B2 * | 12/2024 | Zhu | H01R 31/06 |
| 2008/0057782 | A1 | 3/2008 | Berthet et al. | |
| 2011/0281461 | A1 | 11/2011 | Yan | |

FOREIGN PATENT DOCUMENTS

| | | | |
|---|---|---|---|
| JP | 08-335483 | A | 12/1996 |
| JP | 10-032042 | A | 2/1998 |
| JP | H10-172673 | A | 6/1998 |
| JP | 2003-178844 | A | 6/2003 |
| JP | 2006-084212 | A | 3/2006 |
| JP | 2007-073441 | A | 3/2007 |
| JP | 2008-288120 | A | 11/2008 |
| KR | 10-1448705 | B1 | 10/2014 |
| KR | 10-2019-0041860 | A | 4/2019 |
| KR | 2019-0041860 | A | 4/2019 |
| KR | 10-1992258 | B1 | 6/2019 |
| KR | 2019-0060662 | A | 6/2019 |
| WO | 2017/022141 | A1 | 2/2017 |
| WO | 2019/074310 | A1 | 4/2019 |

OTHER PUBLICATIONS

International Search Report mailed Sep. 6, 2021 for International Application No. PCT/KR2021/006781 and its English translation.
Non-final office action mailed Jul. 12, 2021 from the Korean Intellectual Property Office for Korean Application No. 10-2020-0065810.
Notice of Allowance mailed Dec. 16, 2021 from the Korean Intellectual Property Office for Korean Application No. 10-2020-0065810.
Non-final Office Action mailed on Dec. 12, 2023 from the Japanese Patent Office for Japanese Application No. 2022-573675.
Chinese Office Action mailed on Sep. 3, 2025 from Chinese Patent Office for Application No. 202180040266.7.

* cited by examiner

CONNECTOR FOR PREVENTING CHARACTERISTIC IMPEDANCE MISMATCH

CROSS-REFERENCE TO RELATED APPLICATIONS

This application is a continuation application of International Application No. PCT/KR2021/006781, filed Jun. 1, 2021, which claims the benefit of Korean Patent Application No. 10-2020-0065810, filed Jun. 1, 2020, in the Korean Intellectual Property Office, the disclosures of which are incorporated herein in their entirety by reference.

TECHNICAL FIELD

The present invention relates to a connector for preventing a characteristic impedance mismatch, and more particularly, to a connector for preventing a characteristic impedance mismatch, which is capable of being more slimly manufactured while maintaining desired impedance matching.

BACKGROUND ART

In general, an RF connector for wireless communication is designed to have characteristic impedance of 50Ω. The characteristic impedance is set when a connector is matched.

In the case of microwave engineering, it has been known that impedance of 33Ω implements the best power transmission characteristics in respect to electromagnetic wave energy, and impedance of about 75Ω makes the smallest distortion of a signal waveform, and impedance of 50Ω, which is an intermediate value that favorably satisfies both the characteristics, is used as the characteristic impedance.

In particular, because an entire circuit of a mobile communication system is designed to have impedance of 50Ω, there is a problem in that there is no compatibility when the connector finds another impedance. Further, there is a problem in that when a difference between 50Ω and the characteristic impedance of the connector increases, the signal waveform is distorted, and the power transmission characteristics deteriorate.

The problem of the distortion of the signal waveform or the deterioration of the power transmission characteristics becomes severer during a process of absorbing an assembling tolerance of the RF connector that electrically connects contact parts of two substrates.

For example, FIG. 1 is a cross-sectional view that is one of the drawings enclosed in Korean Patent No. 10-1992258 (published on Jun. 25, 2019) (hereinafter, referred to as a 'registered patent document'). As illustrated in FIG. 1, stationary modules 210 and 220 and contact modules 110 and 120 are included between first and second panels respectively corresponding to the two substrates, and the contact modules 110 and 120 are movable relative to the stationary modules 210 and 220. The above-mentioned design of the characteristic impedance prevents a mismatch between an internal space between the stationary modules 210 and 220 and an internal space between the contact modules 110 and 120.

More specifically, as illustrated in FIG. 1, the stationary modules 210 and 220 include a stationary body 210 made of a conductive material and having a hollow portion 210*a*, and a fixing pin 220 provided in the stationary body 210 and configured to come into contact with the first panel by means of a stationary insulator 230. The contact modules 110 and 120 include a contact body 110 made of a conductive material and having a hollow portion 110*a*, and a contact pin 120 provided in the contact body 110 and configured to come into contact with the second panel by means of a contact insulator 130.

In this case, to prevent the characteristic impedance mismatch, an elastic member 410 provided in the form of a coil spring is accommodated in the hollow portion 210*a* of the stationary body 210 and the hollow portion 110*a* of the contact body 110. The elastic member 410 is fixed by the stationary insulator 230 and the contact insulator 130 that are made of dielectric materials having predetermined permittivity. One end of the elastic member 410 is supported on the stationary body 210, and the other end of the elastic member 410 is supported on the contact body 110. The elastic member 410 maintains a predetermined contact force by elastically supporting the contact body 110 on the second panel while being compressed and extended by an external force transmitted during an assembling process.

The registered patent document provides an advantage of easily absorbing an assembling tolerance between the first and second panels during the process of assembling the stationary modules 210 and 220 and the contact modules 110 and 120. However, there is a problem in that the elastic member 410 provided in the form of a coil spring needs to be designed at a position, which at least deviates from the hollow portion 210*a* of the stationary body 210 and the hollow portion 110*a* of the contact body 110, to prevent the characteristic impedance mismatch.

That is, the registered patent document discloses that as illustrated in FIG. 1, one end of the elastic member 410 is provided to support the stationary body 210 at a position separated from the hollow portion 210*a* of the stationary body 210 by an elastic member support groove 217 provided in the form of a groove provided outside the stationary body 210, and the other end of the elastic member 410 is designed to be elastically supported on a portion corresponding to an outer side of the hollow portion 110*a* of the contact body 110. For this reason, a diameter of the stationary body 210 needs to be designed to be at least larger than about twice reference numeral D in FIG. 1 in order to install the elastic member 410, which causes a problem in that a slim design of a product is inevitably restricted.

DISCLOSURE

Technical Problem

The present invention has been made in an effort to solve the above-mentioned technical problems, and an object of the present invention is to provide a connector for preventing a characteristic impedance mismatch, which is capable of preventing the characteristic impedance mismatch.

Further, another object of the present invention is to provide a connector for preventing a characteristic impedance mismatch, which has a slimmer shape.

In addition, still another object of the present invention is to provide a connector for preventing a characteristic impedance mismatch, which may have a reduced size and thus be disposed with high density in a communication apparatus.

Technical problems of the present invention are not limited to the aforementioned technical problems, and other technical problems, which are not mentioned above, may be clearly understood by those skilled in the art from the following descriptions.

Technical Solution

One exemplary embodiment according to the present invention provides a connector for preventing a characteristic impedance mismatch, the connector including: a stationary module fixed, by soldering, to any one (hereinafter, referred to as a 'first panel') of two panels disposed in parallel with each other, the stationary module having therein an impedance matching space (hereinafter, referred to as a 'matching space'); a moving module disposed to move to the inside or outside of the matching space of the stationary module and provided to be in contact with the other (hereinafter, referred to as a 'second panel') of the two panels; and an elastic member disposed in the matching space of the stationary module and configured to elastically support the moving module on the second panel, in which the moving module includes: a moving terminal pin made of a conductive material and having one end being in contact with the second panel, and the other end configured to establish an electrical signal line between the moving terminal pin and the first panel by means of the stationary module; a moving insulator provided to surround a part of an outer peripheral surface of the moving terminal pin and disposed to implement a characteristic impedance matching design value in the matching space, the moving insulator having predetermined permittivity; and an external conductor part disposed between the moving insulator and the stationary module and disposed to prevent the elastic member from being in direct contact with at least any one of the moving insulator and the moving terminal pin, the external conductor part being configured to transmit an elastic supporting force of the elastic member to the moving insulator.

In this case, the stationary module may include: a stationary housing having the matching space; a stationary insulator configured to block one side of the matching space of the stationary housing; and a stationary terminal pin having one end being in contact with the first panel while penetrating the stationary insulator, and the other end electrically connected to the moving terminal pin, one end of the elastic member may be supported in the stationary housing without being in contact with the stationary insulator, and the other end of the elastic member may be supported on the external conductor part without being in contact with the moving insulator.

In addition, the one end and the other end of the elastic member may each have the largest coil diameter, and the coil diameter may gradually decrease toward a middle portion.

In addition, the elastic member may be shaped to have a constant coil diameter.

In addition, one end of the elastic member may be supported on a stationary part resonance prevention rib protruding inward from the stationary housing so that one end of the elastic member is not in contact with the stationary insulator, and the other end of the elastic member may be supported on a moving part resonance prevention rib protruding inward from the external conductor part so that the other end of the elastic member is not in contact with the moving insulator.

In addition, one end of the elastic member may be supported on a stationary part resonance prevention rib protruding inward from the stationary housing so that one end of the elastic member is not in contact with the stationary insulator, and the other end of the elastic member may be supported at a tip of the external conductor part.

In addition, the external conductor part may include: an external conductor main body configured such that an inner peripheral surface thereof surrounds an outer peripheral surface of the moving insulator, and a part of an outer peripheral surface thereof is caught in the matching space of the stationary housing and restricts a movable distance (hereinafter, referred to as a 'moving section') between the first and second panels; and an external conductor guide extending from the external conductor main body toward the first panel and configured to slip on an inner peripheral surface of the stationary housing when the external conductor main body moves.

In addition, a part of the external conductor main body may be formed to have an outer diameter corresponding to the inner peripheral surface of the stationary housing, and the stationary housing may include one side catching portion configured to catch the external conductor main body while defining one end of the moving section, and the other side catching portion configured to catch the external conductor main body while defining the other end of the moving section and formed to be stepped.

In addition, the external conductor guide may extend so that a tip thereof is closer to the first panel than the one side catching portion.

In addition, the connector may further include a cover signal leak blocking member provided on the stationary module and configured to prevent an electrical signal leak through a cover housing that mediates coupling of the stationary module to the first panel.

In addition, the connector may further include a second panel signal leak blocking member provided on the moving module and configured to prevent an electrical signal leak through the second panel.

In addition, the cover signal leak blocking member or the second panel signal leak blocking member may each be made of a conductor material and elastic material.

In addition, the stationary insulator may be shaped to surround an entire outer peripheral surface of the stationary terminal pin except for a portion exposed to the first panel.

In addition, the stationary terminal pin connected to the moving terminal pin may have a hollow portion into which a part of the moving terminal pin is inserted while overlapping the hollow portion, and the hollow portion may be formed by being cut out by a plurality of cut-out portions.

Advantageous Effects

The embodiment of the connector for preventing a characteristic impedance mismatch according to the present invention may achieve the following various effects.

First, the function of blocking static electricity is provided by the external conductor part and the elastic member, which makes it possible to prevent a characteristic impedance mismatch in the impedance matching space.

Second, the degree of design freedom related to the installation position of the elastic member is improved, which makes it possible to manufacture the overall slim product.

Third, the slim product may be disposed with high density in the communication apparatus, which makes it possible to improve communication efficiency.

The effects of the present invention are not limited to the aforementioned effects, and other effects, which are not mentioned above, will be clearly understood by those skilled in the art from the claims.

EXPLANATION OF REFERENCE NUMERALS AND SYMBOLS

Figure 1:
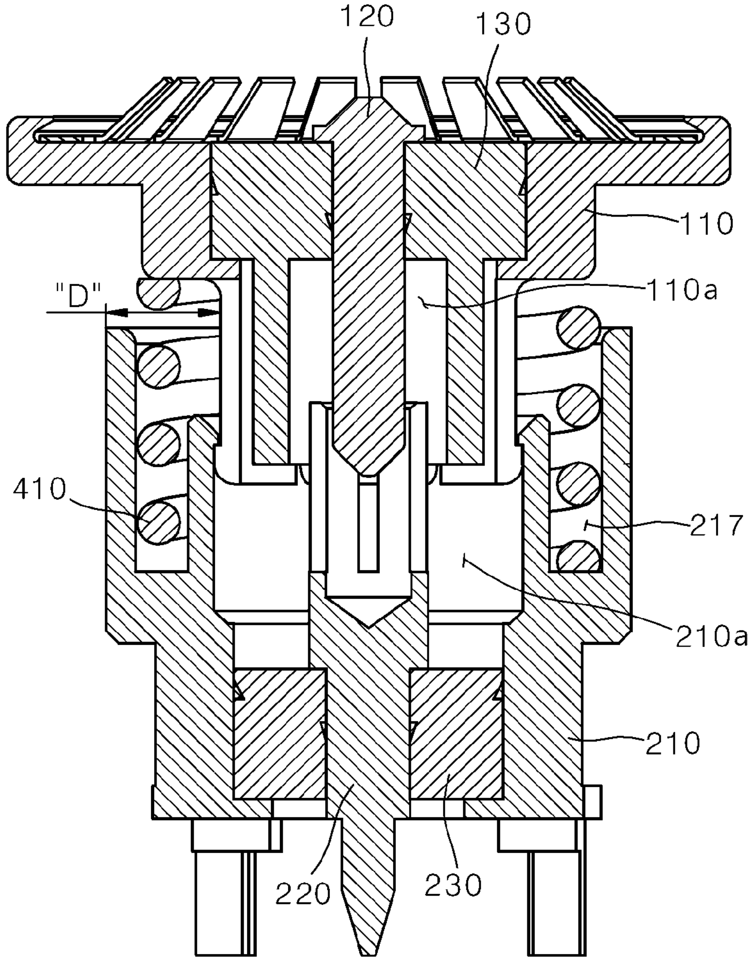
FIG. 1 is a cross-sectional view that is one of the drawings disclosed in Korean Patent No. 10-1992258 (published Jun. 25, 2019, hereinafter, referred to as 'registered patent document').

F: Stationary module
10: Stationary housing
12: Stationary part resonance prevention rib
13: Stopper stepped portion
14: One side catching portion
15: Blocking member installation end
16: The other side catching portion
20: Stationary terminal pin
21: Stationary pin portion
23: Pin main body portion
25: Hollow pin portion
26: Hollow cut-out portion
30: Stationary insulator
M: Moving module
20': Moving terminal pin
21': Moving pin portion
22': Moving contact part
30': Moving insulator
40': External conductor part
41': External conductor main body
42': External conductor guide
44': Moving part resonance prevention rib
60: Elastic member
70: Cover signal leak blocking member
80: Second panel signal leak blocking member
90: Matching space

BEST MODE

Hereinafter, various embodiments of a connector for preventing a characteristic impedance mismatch according to the present invention will be described below in detail with reference to the accompanying drawings.

In giving reference numerals to constituent elements of the respective drawings, it should be noted that the same constituent elements will be designated by the same reference numerals, if possible, even though the constituent elements are illustrated in different drawings. Further, in the following description of the embodiments of the present invention, a detailed description of related publicly-known configurations or functions will be omitted when it is determined that the detailed description obscures the understanding of the embodiments of the present invention.

In addition, the terms first, second, A, B, (a), and (b) may be used to describe constituent elements of the embodiments of the present invention. These terms are used only for the purpose of discriminating one constituent element from another constituent element, and the nature, the sequences, or the orders of the constituent elements are not limited by the terms. Further, unless otherwise defined, all terms used herein, including technical or scientific terms, have the same meaning as commonly understood by those skilled in the art to which the present invention pertains. The terms such as those defined in commonly used dictionaries should be interpreted as having meanings consistent with meanings in the context of related technologies and should not be interpreted as ideal or excessively formal meanings unless explicitly defined in the present application.

Figure 2:
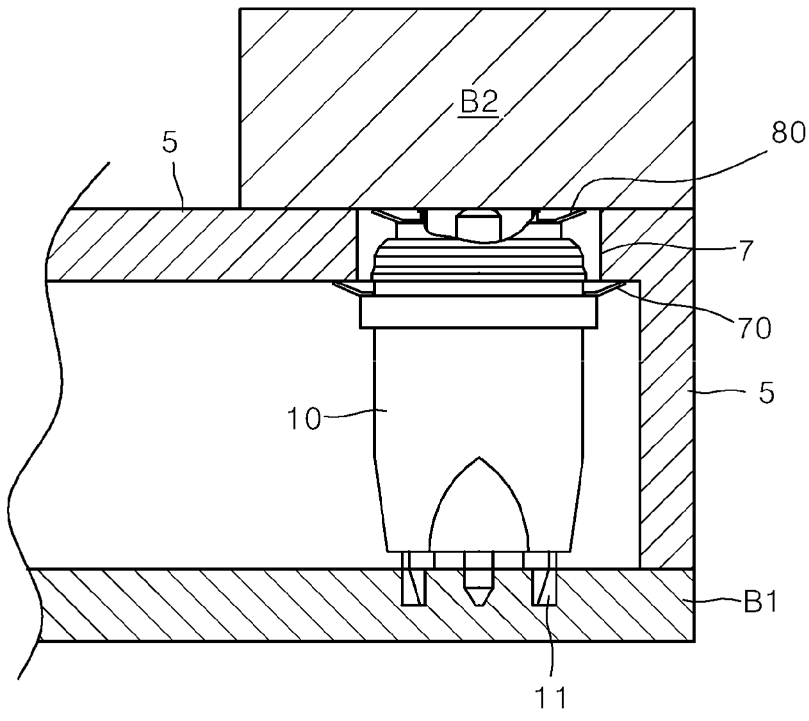
FIGS. 2 and 3 are partial cross-sectional views illustrating various installation examples of a connector for preventing a characteristic impedance mismatch according to the present invention.
Figure 3:
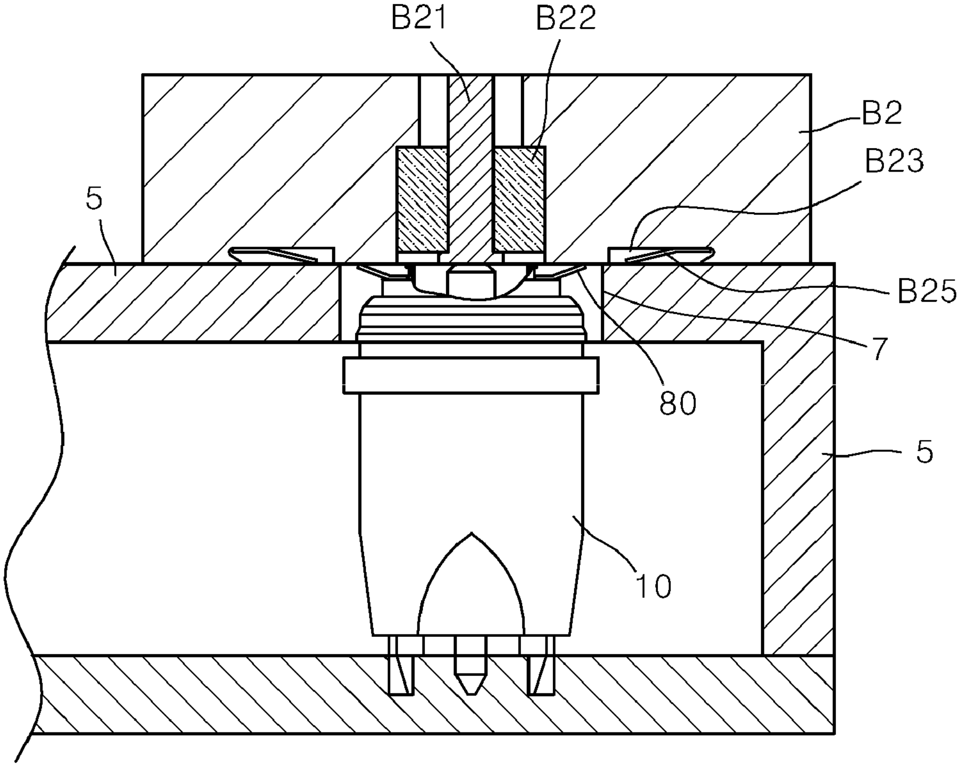

FIGS. 2 and 3 are partial cross-sectional views illustrating various installation examples of a connector for preventing a characteristic impedance mismatch according to the present invention.

As illustrated in FIG. 2, a connector for preventing a characteristic impedance mismatch according to the present invention serves to establish an electrical signal line between first and second panels B1 and B2.

In this case, the first and second panels B1 and B2 may each be a printed circuit board (PCB). In addition, the first panel B1 may be a printed circuit board. The second panel B2 may be an RF connection part (see FIG. 3) having a printed circuit board (see FIG. 2) or an antenna element (not illustrated).

A cover housing 5 may be separately provided between the first and second panels B1 and B2 and securely fix the connector for preventing a characteristic impedance mismatch according to the present invention.

More specifically, as illustrated in FIG. 2, in the embodiment of the connector for preventing a characteristic impedance mismatch according to the present invention, one end of the connector is fixed to the first panel B1 by soldering, the other end of the connector is supported on the cover housing 5, and the second panel B2 is brought into close contact with the other end of the connector from the outside, such that the electrical signal line may be established between the first and second panels B1 and B2.

In this case, to connect an electrical signal to the second panel B2, a signal path 7 having a predetermined diameter is formed to be opened in the cover housing 5. The other end of the connector for preventing a characteristic impedance mismatch according to the present invention penetrates and is exposed through the signal path 7. The second panel B2 may come into close contact with the portion exposed through the signal path 7.

Referring to FIG. 2, a cover signal leak blocking member 70 and a second panel signal leak blocking member 80 may be further respectively provided at the other end (an end of a stationary module F to be described below and an end of a moving module M to be described below) of the embodiment of the connector for preventing a characteristic impedance mismatch according to the present invention. The cover signal leak blocking member 70 supports and covers an inner rim portion of the signal path 7 of the cover housing 5. The second panel signal leak blocking member 80 supports and covers an outer surface of a contact part (not illustrated) of the second panel B2.

The cover signal leak blocking member 70 and the second panel signal leak blocking member 80 may serve to prevent a signal leak to the outside from the electrical signal line established to penetrate an approximately center between the cover signal leak blocking member 70 and the second panel signal leak blocking member 80. Further, the cover signal leak blocking member 70 and the second panel signal leak blocking member 80 may each be made of a conductive material and thus also serve as a ground terminal. Further, the cover signal leak blocking member 70 and the second panel signal leak blocking member 80 may each be made of an elastic material and thus also serve to absorb an assembling tolerance while being stably elastically supported on the cover housing 5 and the second panel B2 even though external force such as an assembling force is transmitted.

Referring to FIG. 3, the embodiment of the connector for preventing a characteristic impedance mismatch according to the present invention need not necessarily have the cover signal leak blocking member 70. It is possible to sufficiently prevent a signal leak by means of a signal shield implemented by the stationary housing 10 of the stationary module F to be described below and an external conductor part 40' of the moving module M to be described below. Therefore, unlike the contents described with reference to FIG. 2, the cover signal leak blocking member 70 is removed while the second panel signal leak blocking member 80 remains, which makes it possible to reduce manufacturing costs.

Meanwhile, in case that the second panel B2 is configured as a radio frequency (RF) connector having an antenna element and the like, the second panel B2 may further include a contact terminal B21, a fixing block B22 configured to fix the contact terminal B21, and a filter-side signal leak blocking member B25 provided outside a rim of the signal path 7 of the cover housing 5 and configured to prevent a signal leak.

One end of the filter-side signal leak blocking member B25 may be fixedly installed on a blocking member installation groove B23 recessed in the second panel B2, and the other end of the filter-side signal leak blocking member B25 may be elastically supported on an outer surface of the rim of the signal path 7 of the cover housing 5.

Figure 4:
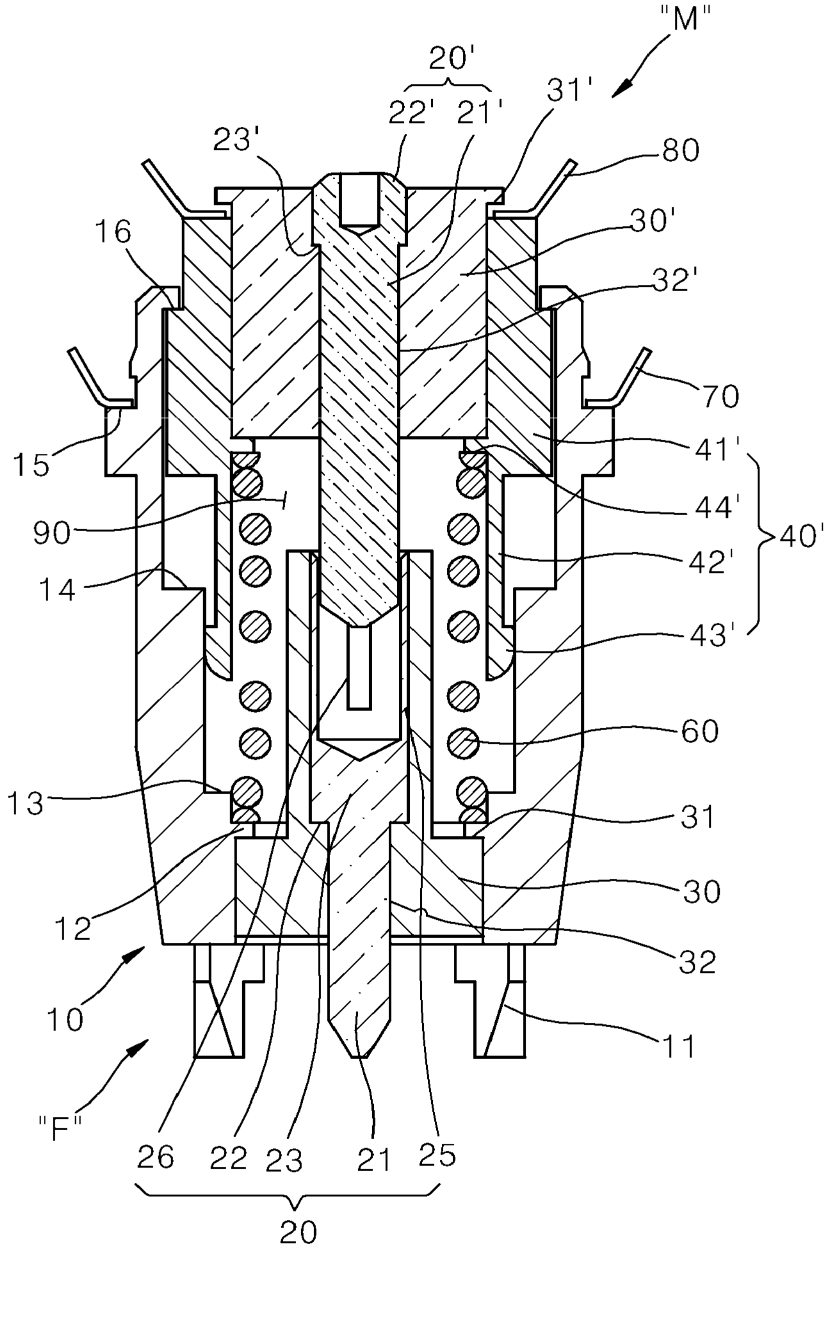
FIGS. 4 to 6 are cross-sectional views illustrating various embodiments of the connector for preventing a characteristic impedance mismatch according to the present invention.
Figure 5:
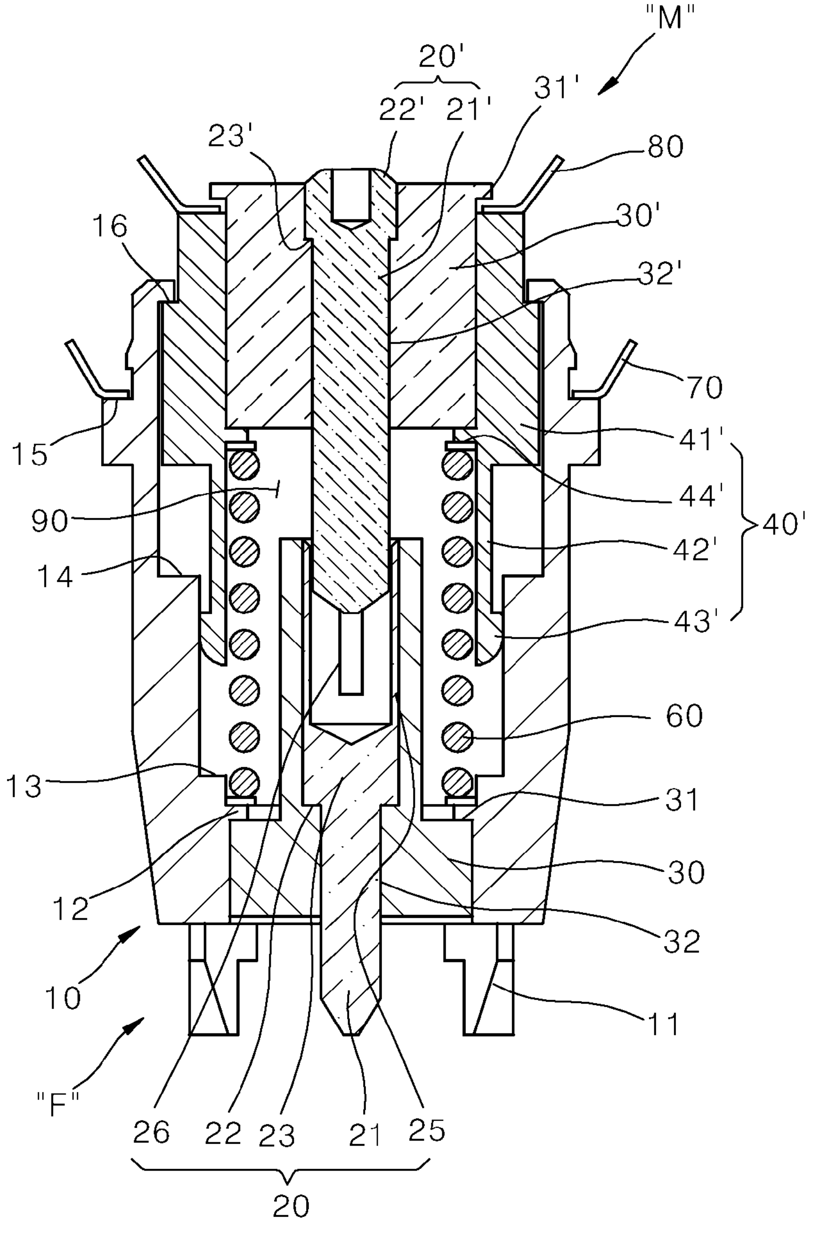
Figure 6:
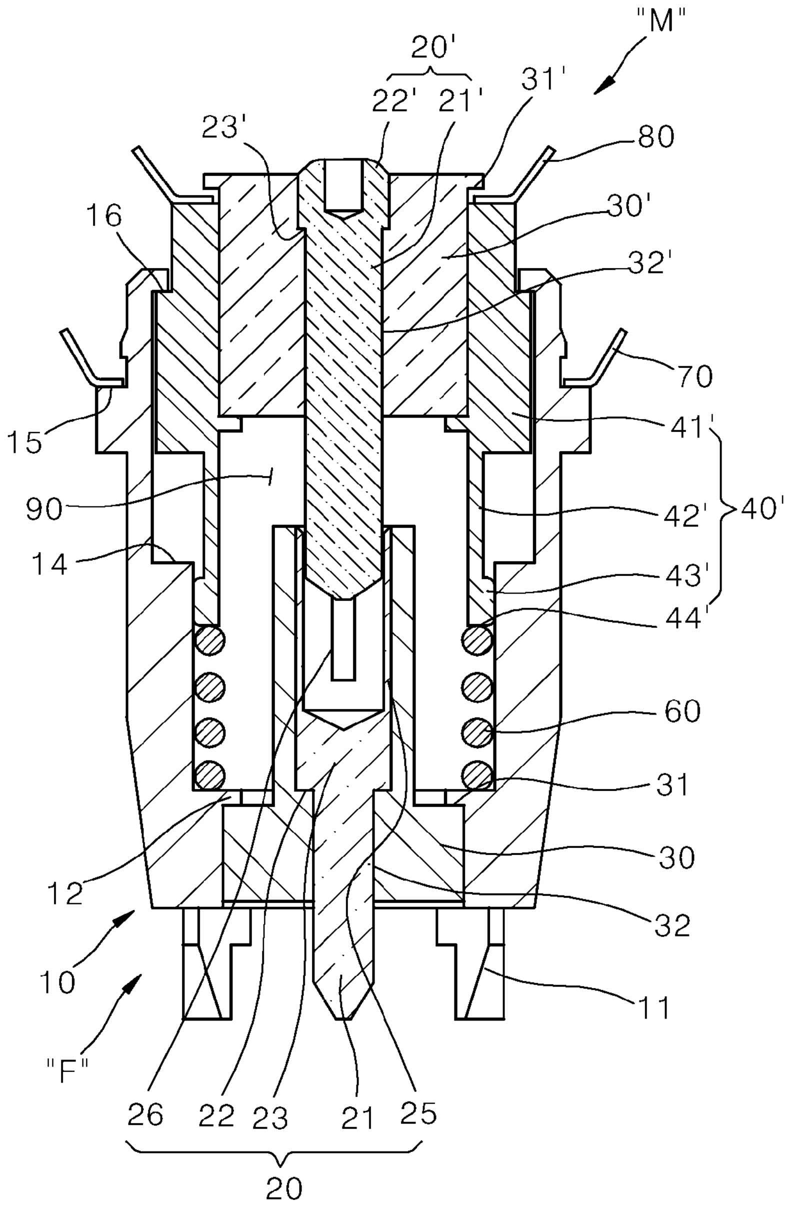

FIGS. 4 to 6 are cross-sectional views illustrating various embodiments of the connector for preventing a characteristic impedance mismatch according to the present invention.

Hereinafter, for convenience of description, the embodiment described with reference to FIG. 4 will be referred to as a 'first embodiment', the embodiment described with reference to FIG. 5 will be referred to as a 'second embodiment', and the embodiment described with reference to FIG. 6 will be referred to as a 'third embodiment'.

As illustrated in FIG. 4, the connector for preventing a characteristic impedance mismatch according to the first embodiment may include the stationary module F and the moving module M.

The stationary module F is fixed, by soldering, to the first panel B1 that is one of the two panels disposed in parallel with each other. The stationary module F may have an impedance matching space 90 (hereinafter, referred to as a 'matching space') therein.

The moving module M may be disposed to move to the outside or inside of the matching space 90 of the stationary module F. The moving module M may come into contact with the second panel B2.

Further, as illustrated in FIG. 4, the connector for preventing a characteristic impedance mismatch according to the first embodiment may further include an elastic member 60 disposed in the matching space 90 of the stationary module F and configured to elastically support the moving module M on the second panel B2.

In the connector for preventing a characteristic impedance mismatch according to the first embodiment that is configured as described above, the stationary module F and a part of the moving module M are provided to transmit power, thereby establishing the electrical signal line.

More specifically, as illustrated in FIG. 4, the stationary module F may include a stationary housing 10 having the matching space 90, a stationary insulator 30 configured to shield one side of the matching space 90 of the stationary housing 10, and a stationary terminal pin 20 having one end being in contact with the first panel B1 while penetrating the stationary insulator 30, and the other end electrically connected to a moving terminal pin 20' of the moving module M.

The stationary housing 10 may be made of a conductive material, or an inner peripheral surface of the stationary housing 10, which defines the matching space 90, is plated with a conductive material, such that the characteristic impedance matching may easily designed in the matching space 90.

The inner peripheral surface of the stationary housing 10 may have a plurality of stepped portions having different inner diameters.

More specifically, a portion of the matching space 90 of the stationary housing 10, which is close to the first panel B1, may have a stationary part resonance prevention rib 12 by which one end of the elastic member 60 and the stationary insulator 30 are divided and caught. Further, one side catching portion 14 and the other side catching portion 16 may be formed to be stepped on a portion of the matching space 90 of the stationary housing 10, which is close to the second panel B2, and restrict a movable distance (hereinafter, referred to as a 'moving section') of the external conductor part 40' among the components of the moving module M to be described below. Further, a stopper stepped portion 13 may be further formed on the inner peripheral surface of the stationary housing 10 and restrict a movement of a tip 43' of an external conductor guide 42' of the external conductor part 40' to be described below.

In addition, a plurality of solder legs 11 may be integrally formed at one end of the stationary housing 10 (i.e., a portion corresponding to the first panel B1). The plurality of solder legs 11 may be inserted into solder holes (no reference numeral) formed in advance in the first panel B1, and then the plurality of solder legs 11 may be coupled by soldering. In this case, a stationary pin portion 21 of the stationary terminal pin 20, which will be described below, may be inserted into a hole (no reference numeral) of the contact part formed on the first panel B1, and then the stationary pin portion 21 may be coupled by soldering.

The stationary terminal pin 20 may be made of a conductive material and connected to the moving terminal pin 20' so that an electrical signal may be transmitted therebetween.

More specifically, the stationary terminal pin 20 may include the stationary pin portion 21 extending from the matching space 90 toward the first panel B1 and protruding outward, a pin main body portion 23 having a larger diameter than the stationary pin portion 21, and a hollow pin portion 25 extending from the pin main body portion 23 toward the second panel B2 and having therein a hollow portion (no reference numeral) into which a part of a moving pin portion 21' of the moving terminal pin 20' to be described below is inserted.

A catching projection 22 may be formed on a boundary between the stationary pin portion 21 and the pin main body portion 23 by a difference in diameter. The stationary insulator 30 may be caught by the catching projection 22, such that the stationary housing 10 may be prevented from being withdrawn to the outside.

The hollow portion of the hollow pin portion 25 is opened in a direction in which the moving terminal pin 20' is provided. A part of an outer peripheral surface of the hollow pin portion 25 may have a plurality of hollow cut-out portions 26 formed to be cut so that the inside and outside of the hollow pin portion 25 communicate with each other. The plurality of hollow cut-out portions 26 provides predetermined lateral tension to an outer peripheral surface of the moving pin portion 21' of the moving terminal pin 20' inserted into the hollow portion, which makes it possible to prevent disconnection of the electrical signal connection between the stationary terminal pin 20 and the moving terminal pin 20'.

Meanwhile, the stationary insulator 30 may be made of an insulating material or a dielectric material having predetermined permittivity. The stationary insulator 30 may serve to insulate a portion between the stationary terminal pin 20 and the stationary housing 10 and fix the stationary terminal pin 20 to the stationary housing 10.

That is, a stationary part through-hole 32 may be disposed at a center of the stationary insulator 30 and formed through the stationary insulator 30 in a direction perpendicular to the first and second panels B1 and B2. Among the components of the stationary terminal pin 20, the stationary pin portion 21 may completely penetrate the stationary part through-hole 32, such that a part of the stationary pin portion 21 may be exposed to the outside of the stationary housing 10.

The stationary pin portion 21 exposed to the outside of the stationary housing 10 may be coupled, by soldering, to the contact part (not illustrated) formed on the first panel B1. Further, a rim portion 31 of the other end of the stationary insulator 30, which corresponds to the first panel B1, may be caught by the stationary part resonance prevention rib 12 formed on the inner peripheral surface of the stationary housing 10 and thus fixed to be separated from the elastic member 60 without being in contact with the elastic member 60 to be described below.

The stationary part resonance prevention rib 12 formed on the inner peripheral surface of the stationary housing 10 will be described more specifically. The stationary part resonance prevention rib 12 serve to prevent the elastic member 60 from being in direct contact with the stationary insulator 20, thereby preventing resonance from occurring in the matching space 90.

Meanwhile, as illustrated in FIG. 4, the moving module M may include: the moving terminal pin 20' made of a conductive material and having one end being in contact with the second panel B2 and the other end configured to establish the electrical signal line between the moving terminal pin 20' and the first panel B1 by means of the stationary module F; the moving insulator 30' provided to surround a part of the outer peripheral surface of the moving terminal pin 20' and disposed to implement a characteristic impedance matching design value in the matching space 90, the moving insulator 30' having predetermined permittivity; and the external conductor part 40' disposed between the moving insulator 30' and the inner peripheral surface of the stationary housing 10 so that the elastic member 60 is not in direct contact with at least any one of the moving insulator 30' and the moving terminal pin 20', the external conductor part 40' being configured to transmit an elastic supporting force of the elastic member 60 to the moving insulator 30'.

As illustrated in FIG. 4, the moving terminal pin 20' may include: the moving pin portion 21' extending by a predetermined length from the second panel B2 toward the first panel B1 and configured such that a part of one end thereof is inserted and connected into the hollow portion in the hollow pin portion 25 of the stationary terminal pin 20; and a moving contact part 22' formed at the other end of the moving pin portion 21' and configured such that a part of a center thereof is cut out in the form of a groove to increase a contact ratio of the second panel B2 to the contact part (not illustrated).

The moving terminal pin 20' may serve to receive an electrical signal, which is transmitted from the first panel B1, through the stationary terminal pin 20 and transmit the electrical signal to the second panel B2. Alternatively, the moving terminal pin 20' may serve to transmit an electrical signal, which is transmitted from the second panel B2, to the first panel B1 through the stationary terminal pin 20.

In this case, unlike the stationary terminal pin 20, the moving terminal pin 20' is provided to move in a predetermined moving section to the inside or outside of the matching space 90 of the stationary housing 10 and establishes the electrical signal line while absorbing an assembling tolerance present between the first and second panels B1 and B2.

Further, the moving insulator 30', which is provided to surround a part of the outer peripheral surface of the moving terminal pin 20', may maintain a characteristic impedance matching design value in the matching space 90 even when the moving terminal pin 20' moves in the moving section.

More specifically, as illustrated in FIG. 4, the moving insulator 30' may be provided to surround a part of the outer peripheral surface of the moving pin portion 21' of the moving terminal pin 20'. Among the components of the moving terminal pin 20', the moving contact part 22' is provided to have an outer diameter larger than an outer diameter of the moving pin portion 21', such that a moving pin catching portion 23' is formed to be stepped at a boundary portion between the moving pin portion 21' and the moving contact part 22', and a close-contact force of the second panel B2 may allow the moving insulator 30' to move in the moving section in conjunction with the moving terminal pin 20'.

Further, a catching rim end 31' is formed to be stepped and has a larger outer diameter than an outer rim end of the moving insulator 30' adjacent to the second panel B2. Further, the moving insulator 30' is also caught by the external conductor part 40' to be described below, such that the moving insulator 30' may be moved in the moving section together with the moving terminal pin 20' and the external conductor part 40' by the close-contact force of the second panel B2.

A moving through-hole 32' is formed at a center of the moving insulator 30' so that the moving pin portion 21', which is one of the components of the moving terminal pin 20', completely penetrates the moving through-hole 32'. The moving pin catching portion 23', which has a larger outer diameter than the moving pin portion 21' and is positioned at the boundary portion with the moving contact part 22', may be caught by any point in the moving through-hole 32'.

The moving insulator 30' may be designed such that the external shape and permittivity thereof maintains the characteristic impedance design value in the matching space 90 of the stationary housing 10. Further, the moving insulator 30' may be designed to prevent a characteristic impedance mismatch in the matching space 90 even when the moving terminal pin 20' is moved in the moving section by the close-contact force of the second panel B2 during the assembling process.

Meanwhile, as illustrated in FIG. 4, the external conductor part 40' may include: an external conductor main body 41' provided to surround the outer peripheral surface of the moving insulator 30'; and an external conductor guide 42' extending from the external conductor main body 41' toward the first panel B1 and configured to slip on an inner peripheral surface of the stationary housing 10 when the external conductor main body 41' moves.

A part of the outer peripheral surface of the external conductor main body 41' may have an outer diameter caught between one side catching portion 14 and the other side catching portion 16 of the inner peripheral surface of the stationary housing 10, which are formed to be close to the second panel B2. When the external conductor main body 41' is moved in the moving section by the close-contact force of the second panel B2, the external conductor main body 41' is caught by one side catching portion 14 and the other side catching portion 16, thereby restricting the moving section.

That is, a part of the outer peripheral surface of the external conductor main body 41' is formed to have an outer diameter corresponding to the inner peripheral surface of the stationary housing 10, i.e., have an outer diameter corresponding to an outer diameter of the inner peripheral surface between one side catching portion 14 and the other side catching portion 16. A length of the external conductor main body 41' having the outer diameter may be smaller than a distance between one side catching portion 14 and the other side catching portion 16, such that the moving section of the moving module M may be restricted within a range of a difference in length.

Further, the external conductor main body 41' may have a moving part resonance prevention rib 44' integrally formed so that an inner diameter of a part of an inner peripheral surface thereof is smaller than the other part. The moving part resonance prevention rib 44' supports the other end of the elastic member 60 to be described below and prevents the other end of the elastic member 60 from being in direct contact with and supported on the moving insulator 30', which makes it possible to prevent the occurrence of resonance caused by the movement in the matching space 90.

Meanwhile, the external conductor guide 42' may extend so that the tip 43' thereof is closer to the first panel B1 than one side catching portion 14.

Therefore, the tip 43' of the external conductor guide 42' is slipped on the inner peripheral surface of the stationary housing 10, which corresponds to an outer side of one side catching portion 14, by an elastic supporting force of the elastic member 60 to be described below in a state in which the other side of the external conductor main body 41' is fixed to the other side catching portion 16 of the stationary housing 10. Therefore, the tip 43' of the external conductor guide 42' is prevented from being caught in the stationary housing 10, which makes it possible to prevent a malfunction.

The external conductor part 40', together with the second panel signal leak blocking member 80, serves as a ground terminal, thereby serving to stabilize a signal flow in the matching space 90.

In particular, the external conductor part 40' is one of the components of the moving module M and moves in conjunction with the moving terminal pin 20' and the moving insulator 30' that move in the moving section. Further, the external conductor part 40' may serve to block static electricity together with the elastic member 60 provided to be in direct contact with the external conductor part 40'.

As the external conductor part 40' and the elastic member 60 block static electricity, a degree of freedom in designing an installation position of the elastic member 60 is improved, which provides an advantageous effect of reducing an overall size in the width direction of the connector for preventing a characteristic impedance mismatch according to the present invention.

More specifically, in the case of a connector (see FIG. 1) in the related art, a space in which the elastic member 410 is installed is provided in a width direction without an external conductor part (reference numeral 40' in the present invention) in order to prevent the elastic member 410 from being in direct contact with the stationary insulator 230 and the contact insulator 130, and the elastic member 410 is installed to provide an elastic force to the contact modules 110 and 120 relative to the stationary modules 210 and 220. In contrast, in case that the connector for preventing a characteristic impedance mismatch according to the present invention, the external conductor part 40' prevents the elastic member 60 from being in direct contact with the stationary insulator 30 and the moving insulator 30', which significantly improves a degree of design freedom related to the installation position in the matching space 90.

A blocking member installation end 15 may be formed to be stepped on a part of the outer peripheral surface of the outer side of the stationary housing 10, which is adjacent to the second panel B2, and the cover signal leak blocking member 70 is installed on the blocking member installation end 15. Further, the second panel signal leak blocking member 80 may be installed on a tip surface of the external conductor part 40' of the moving module M.

Meanwhile, as illustrated in FIG. 4, the moving module M may move in the range of the moving section relative to the stationary module F fixed to the first panel B1. The moving module M may be elastically supported by the elastic force of the elastic member 60 provided in the matching space 90.

As illustrated in FIG. 4, one end of the elastic member 60 may be supported on the stationary part resonance prevention rib 12 without being in contact with the stationary insulator 30, and the stationary part resonance prevention rib 12 protrudes inward from the stationary housing 10. The other end of the elastic member 60 may be supported on the moving part resonance prevention rib 44' protruding inward from the external conductor part 40'.

The elastic member 60 is compressed to some extent in the state in which the external conductor main body 41', which is one of the components of the external conductor part 40', is caught by the other side catching portion 16 of the stationary housing 10. When the close-contact force is further provided by the close contact with the second panel B2, the elastic member 60 is further compressed and deformed, thereby transmitting the predetermined elastic force, which is in the form of a reaction force, to the external conductor part 40'. The external conductor part 40', which receives the predetermined elastic force from the elastic member 50, moves the moving insulator 30' to bring the moving insulator 30' into close contact with the second panel B2. The moving contact part 22' of the moving terminal pin 20', which moves in conjunction with the moving insulator 30', may be consistently brought into contact with the contact part of the second panel B2 by the predetermined elastic force.

In this case, as described above, it is important for the elastic member 60 to be installed to be prevented from being in direct contact with the stationary insulator 30 and the moving insulator 30' in order to prevent the occurrence of resonance in the matching space 90.

Therefore, as illustrated in FIG. 4, the first embodiment may be implemented in which within a range in which the elastic member 60 is not in direct contact with the stationary insulator 30 and the moving insulator 30', one end and the other end of the elastic member 60 each have the largest coil diameter, and the coil diameter gradually decreases toward a middle portion.

Further, as illustrated in FIGS. 5 and 6, the elastic member 60 may be shaped to have a constant coil diameter.

For example, as illustrated in FIG. 5, the elastic member 60 is formed to have the constant coil diameter from one end to the other end thereof. Like the first embodiment, the second embodiment may be implemented in which one end of the elastic member 60 is supported while being physically separated from the stationary insulator 30 by the stationary part resonance prevention rib 12, and the other end of the elastic member 60 is physically separated from the moving insulator 30' by the moving part resonance prevention rib 44'.

In addition, as illustrated in FIG. 6, the elastic member 60 is formed to have the constant coil diameter from one end to the other end thereof. Like the first and second embodiments, the third embodiment may be implemented in which one end of the elastic member 60 is supported to be physically separated from the stationary insulator 30 by the stationary part resonance prevention rib 12. Unlike the first and second embodiments, the third embodiment may be implemented in which the other end of the elastic member 60 is supported by the tip 43' of the external conductor guide 42'.

Figure 7:
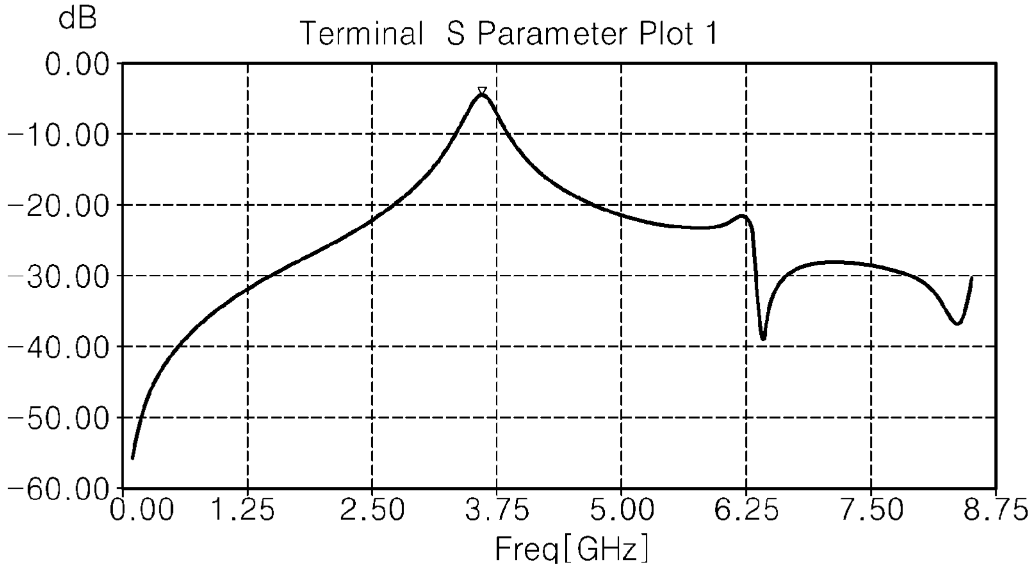
FIG. 7 is a graph illustrating frequency characteristics made when an elastic member is supported to be in direct contact with a stationary insulator of a stationary module and a moving insulator of a moving module.
Figure 8:
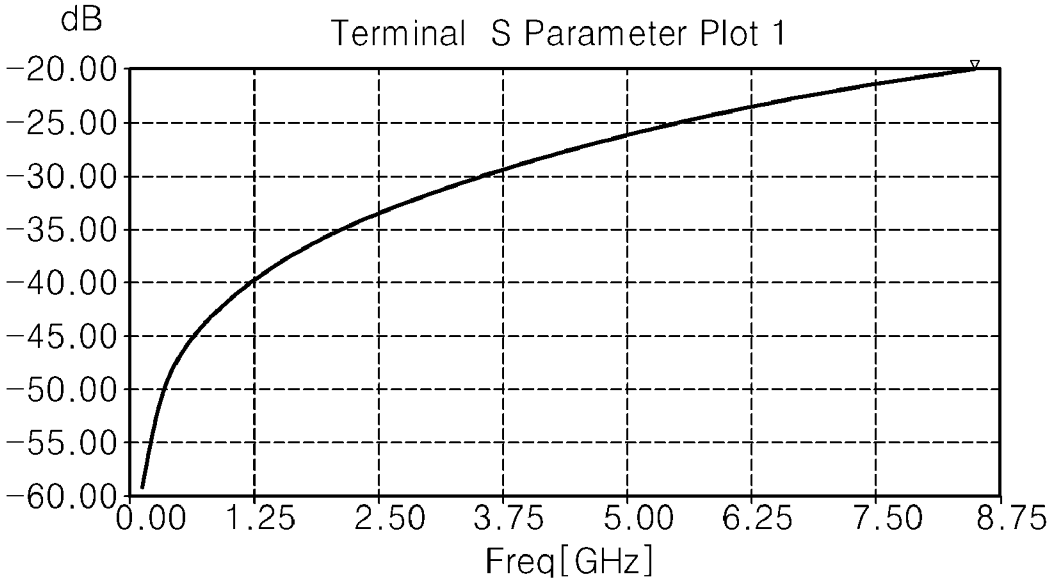
FIG. 8 is a graph illustrating frequency characteristics made when the connector for preventing a characteristic impedance mismatch according to the embodiment of the present invention is applied.

FIG. 7 is a graph illustrating frequency characteristics made when an elastic member is supported to be in direct contact with a stationary insulator of a stationary module and a moving insulator of a moving module, and FIG. 8 is a graph illustrating frequency characteristics made when the connector for preventing a characteristic impedance mismatch according to the embodiment of the present invention is applied.

Referring to FIG. 7, it can be seen that the resonance occurs at a plurality of points in a band section in a state in which the elastic member is supported to be in direct contact with the stationary insulator of the stationary module and/or the moving insulator of the moving module.

However, referring to FIG. 8, it can be seen that the elastic member 60 is not in direct contact with the stationary insulator 30 of the stationary module F and the moving insulator 30' of the moving module M, and no resonance occurs in the band section when the elastic member 60, together with the external conductor part 40', performs the function of blocking static electricity.

According to the embodiment of the connector for preventing a characteristic impedance mismatch according to the present invention configured as described above, a mismatch in the matching space 90 required to be designed to implement the impedance matching may be prevented when a signal is transmitted along the electrical signal line established between the first and second panels B1 and B2, and an overall size in the width direction of the product may be reduced by the free design of the external conductor part 40' and the elastic member 60, which makes it possible to manufacture the connector having a simpler structure.

Various embodiments of the connector for preventing a characteristic impedance mismatch according to the present invention have been described above in detail with reference to the accompanying drawings. However, the present invention is not necessarily limited by the embodiments, and various modifications of the embodiments and any other embodiments equivalent thereto may of course be carried out by those skilled in the art to which the present invention pertains. Accordingly, the true protection scope of the present invention should be determined by the appended claims.

INDUSTRIAL APPLICABILITY

The present invention provides the connector for preventing a characteristic impedance mismatch, which is capable of preventing a characteristic impedance mismatch, being manufactured to have a slimmer shape and a reduced size, and thus be disposed with high density in the communication apparatus.

The invention claimed is:

1. A connector for preventing a characteristic impedance mismatch, the connector comprising:

a stationary module fixed, by soldering, to any one (hereinafter, referred to as a 'first panel') of two panels disposed in parallel with each other, the stationary module having therein an impedance matching space (hereinafter, referred to as a 'matching space');

a moving module disposed to move to the inside or outside of the matching space of the stationary module and provided to be in contact with the other (hereinafter, referred to as a 'second panel') of the two panels; and an elastic member disposed in the matching space of the stationary module and configured to elastically support the moving module on the second panel, wherein the moving module comprises:

a moving terminal pin made of a conductive material and having one end being in contact with the second panel, and the other end configured to establish an electrical signal line between the moving terminal pin and the first panel by means of the stationary module;

a moving insulator provided to surround a part of an outer peripheral surface of the moving terminal pin and disposed to implement a characteristic impedance matching design value in the matching space, the moving insulator having predetermined permittivity; and an external conductor part disposed between the moving insulator and the stationary module and disposed to prevent the elastic member from being in direct contact with at least any one of the moving insulator and the moving terminal pin, the external conductor part being configured to transmit an elastic supporting force of the elastic member to the moving insulator.

2. The connector of claim 1, wherein the stationary module comprises:

a stationary housing having the matching space;

a stationary insulator configured to block one side of the matching space of the stationary housing; and a stationary terminal pin having one end being in contact with the first panel while penetrating the stationary insulator, and the other end electrically connected to the moving terminal pin, wherein one end of the elastic member is supported in the stationary housing without being in contact with the stationary insulator, and wherein the other end of the elastic member is supported on the external conductor part without being in contact with the moving insulator.

3. The connector of claim 2, wherein the elastic member is shaped to have a constant coil diameter.

4. The connector of claim 2, further comprising:

a second panel signal leak blocking member provided on the moving module and configured to prevent an electrical signal leak through the second panel.

5. The connector of claim 2, wherein the stationary insulator is shaped to surround an entire outer peripheral surface of the stationary terminal pin except for a portion exposed to the first panel.

6. The connector of claim 2, wherein the stationary terminal pin connected to the moving terminal pin has a hollow portion into which a part of the moving terminal pin is inserted while overlapping the hollow portion, and wherein the hollow portion is formed by being cut out by a plurality of cut-out portions.

7. The connector of claim 2, further comprising:

a cover signal leak blocking member provided on the stationary module and configured to prevent an electrical signal leak through a cover housing that mediates coupling of the stationary module to the first panel.

8. The connector of claim 7, wherein the cover signal leak blocking member or the second panel signal leak blocking member is made of a conductor material and elastic material.

9. The connector of claim 2, wherein the external conductor part comprises:

an external conductor main body configured such that an inner peripheral surface thereof surrounds an outer peripheral surface of the moving insulator, and a part of an outer peripheral surface thereof is caught in the matching space of the stationary housing and restricts a movable distance (hereinafter, referred to as a 'moving section') between the first and second panels; and an external conductor guide extending from the external conductor main body toward the first panel and configured to slip on an inner peripheral surface of the stationary housing when the external conductor main body moves.

10. The connector of claim 9, wherein a part of the external conductor main body is formed to have an outer diameter corresponding to the inner peripheral surface of the stationary housing, and wherein the stationary housing includes one side catching portion configured to catch the external conductor main body while defining one end of the moving section, and the other side catching portion configured to catch the external conductor main body while defining the other end of the moving section and formed to be stepped.

11. The connector of claim 10, wherein the external conductor guide extends so that a tip thereof is closer to the first panel than the one side catching portion.

12. The connector of claim 2, wherein the one end and the other end of the elastic member each have the largest coil diameter, and the coil diameter gradually decreases toward a middle portion.

13. The connector of claim 12, wherein one end of the elastic member is supported on a stationary part resonance prevention rib protruding inward from the stationary housing so that one end of the elastic member is not in contact with the stationary insulator, and wherein the other end of the elastic member is supported on a moving part resonance prevention rib protruding inward from the external conductor part so that the other end of the elastic member is not in contact with the moving insulator.

14. The connector of claim 12, wherein one end of the elastic member is supported on a stationary part resonance prevention rib protruding inward from the stationary housing so that one end of the elastic member is not in contact with the stationary insulator, and wherein the other end of the elastic member is supported at a tip of the external conductor part.

* * * * *